United States Patent
Borsting et al.

(10) Patent No.: US 11,241,847 B2
(45) Date of Patent: Feb. 8, 2022

(54) SYSTEM AND METHOD FOR ASSISTING IN THE MANUFACTURE OF A WIND TURBINE BLADE SHELL

(71) Applicant: LM WP PATENT HOLDING A/S, Kolding (DK)

(72) Inventors: Dennis Andre Borsting, Kolding (DK); Ivan Engmark Mortensen, Kolding (DK); Lars Fuglsang, Odense S (DK); Per Kjaer Christiansen, Gesten (DK)

(73) Assignee: LM WP PATENT HOLDING A/S, Kolding (DK)

( * ) Notice: Subject to any disclaimer, the term of this patent is extended or adjusted under 35 U.S.C. 154(b) by 423 days.

(21) Appl. No.: 16/144,268

(22) Filed: Sep. 27, 2018

(65) Prior Publication Data

US 2019/0022960 A1 Jan. 24, 2019

Related U.S. Application Data

(63) Continuation of application No. 14/893,221, filed as application No. PCT/EP2013/061242 on May 31, 2013, now Pat. No. 10,118,352.

(51) Int. Cl.
*B29C 70/86* (2006.01)
*B29C 70/54* (2006.01)
(Continued)

(52) U.S. Cl.
CPC ............ *B29C 70/86* (2013.01); *B29C 33/12* (2013.01); *B29C 70/388* (2013.01);
(Continued)

(58) Field of Classification Search
CPC . Y02P 70/50; B29C 2793/0027; B29C 33/12; B29C 70/386; B29C 70/388;
(Continued)

(56) References Cited

U.S. PATENT DOCUMENTS 2,995,777 A * 8/1961 Warnken ................. B29C 70/48
425/111
3,775,219 A 11/1973 Karlson et al.
(Continued)

FOREIGN PATENT DOCUMENTS

EP WO 2013113962 * 8/2013
ES 2382245 A1 6/2012
(Continued)

OTHER PUBLICATIONS

Chinese office action dated Aug. 1, 2018 for corresponding application No. 201710208610.4 with English translation attached.

*Primary Examiner* — Joseph S Del Sole
*Assistant Examiner* — Manley L Cummins, IV
(74) *Attorney, Agent, or Firm* — Nath, Goldberg & Meyer; Jerald L. Meyer; Tanya E. Harkins

(57) ABSTRACT

A method of manufacturing a wind turbine blade shell part is described. Fibre mats and a root end insert are laid up in a mould part in a layup procedure by use of an automated layup system. The fibre mats are laid up by use of a buffer so that the fibre mats may continuously be laid up on the mould surface, also during a cutting procedure. The root end insert is prepared in advance and mounted on a mounting plate. The root end insert is lowered onto the mould by use of the mounting plate and a lowering mechanism. After the wind turbine blade shell has been moulded, the mounting plate is removed.

9 Claims, 10 Drawing Sheets

(51) Int. Cl.
- *B29C 70/38* (2006.01)
- *B29C 33/12* (2006.01)
- *B29D 99/00* (2010.01)
- *F03D 1/06* (2006.01)
- *B32B 38/18* (2006.01)
- *B32B 38/00* (2006.01)
- *B29C 70/56* (2006.01)
- *B29L 31/08* (2006.01)
- *B29K 105/08* (2006.01)

(52) U.S. Cl.
CPC .......... *B29C 70/543* (2013.01); *B29C 70/545* (2013.01); *B29D 99/0025* (2013.01); *F03D 1/0658* (2013.01); *B29C 70/56* (2013.01); *B29C 2793/0027* (2013.01); *B29K 2105/0881* (2013.01); *B29L 2031/085* (2013.01); *B32B 38/0004* (2013.01); *B32B 38/185* (2013.01); *F05B 2230/00* (2013.01); *Y02E 10/72* (2013.01); *Y02P 70/50* (2015.11)

(58) Field of Classification Search
CPC ... B29C 70/541; B29C 70/543; B29C 70/545; B29C 70/56; B29C 33/26; B29C 33/28; B29D 99/0025; B29L 2031/085; F03D 1/0658; Y02E 10/72; B29K 2105/0881; B32B 38/0004; B32B 38/185; F05B 2230/00

See application file for complete search history.

(56) References Cited

U.S. PATENT DOCUMENTS

| | | | |
|---|---|---|---|
| 4,095,322 A * | 6/1978 | Scarpati | B29C 70/345 156/182 |
| 4,285,752 A | 8/1981 | Higgins | |
| 4,419,170 A | 12/1983 | Blad | |
| 4,781,782 A | 11/1988 | Luhman et al. | |
| 5,397,415 A | 3/1995 | Manabe et al. | |
| 5,405,485 A | 4/1995 | Henderson et al. | |
| 6,540,000 B1 | 4/2003 | Darriuex et al. | |
| 7,922,856 B2 | 4/2011 | Hagman et al. | |
| 8,221,575 B2 | 7/2012 | Krogager et al. | |
| 2008/0206059 A1 * | 8/2008 | Hancock | F03D 1/0658 416/213 R |
| 2008/0296197 A1 * | 12/2008 | Kootstra | B60P 3/40 206/525 |
| 2009/0101277 A1 | 4/2009 | Cramer et al. | |
| 2010/0230043 A1 | 9/2010 | Kisch | |
| 2010/0230202 A1 | 9/2010 | Anderson et al. | |
| 2012/0006475 A1 | 1/2012 | Colombo et al. | |
| 2012/0073730 A1 | 3/2012 | Nieuwenhove et al. | |
| 2013/0032287 A1 | 2/2013 | Hagman et al. | |
| 2013/0289089 A1 * | 10/2013 | Morris | A61P 17/08 514/410 |
| 2014/0064870 A1 * | 3/2014 | Thomsen | B60P 3/40 410/44 |
| 2015/0298403 A1 * | 10/2015 | Hedges | B29C 70/34 156/222 |
| 2015/0314536 A1 * | 11/2015 | Smith | B29B 11/16 156/222 |

FOREIGN PATENT DOCUMENTS

| | | | |
|---|---|---|---|
| ES | 2382245 B1 | 5/2013 | |
| GB | 885322 | * 12/1961 | |

* cited by examiner

SYSTEM AND METHOD FOR ASSISTING IN THE MANUFACTURE OF A WIND TURBINE BLADE SHELL

This is a Continuation Application of U.S. patent application Ser. No. 14/893,221, filed Nov. 23, 2015, an application filed as a national stage under 371 of Application No. PCT/EP2013/061242 filed May 31, 2013, the content of each of which is hereby incorporated by reference in its entirety.

TECHNICAL FIELD

The present invention relates to a system for automated layup of fibre mats and a method of laying up fibre mats for the manufacture of parts for a wind turbine blade, in particular the aerodynamic shell part of a wind turbine blade. The present invention further relates to a method of manufacturing a wind turbine blade shell part made of a composite structure comprising a fibre-reinforcement material embedded in a polymer matrix. The present invention additionally relates to a root end assembly for use in the method for manufacturing the wind turbine blade shell. Finally, the invention also relates to a mould for manufacturing a wind turbine blade shell part.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats in each of the two mould parts. Then, the two halves are glued together, often by means of internal flange parts. Glue is applied to the inner face of the lower blade half before the upper blade half is lowered thereon. Additionally, one or two reinforcing profiles (beams) are often attached to the inside of the lower blade half prior to gluing to the upper blade half.

The aerodynamic shell parts are typically made by use of Vacuum Assisted Resin Transfer Moulding (VARTM), where a plurality of fibre mats are arranged on top of a rigid mould parts and possibly also a core material to provide parts having a sandwich structure. When the fibre mats have been stacked and overlapped so as to form the final shape of the wind turbine blade shell part. Then a flexible vacuum bag is arranged on top of the fibre mats and sealed against the rigid mould part, thereby forming a mould cavity containing the fibre mats. Resin inlets and vacuum outlets are connected to the mould cavity. First the mould cavity is evacuated via the vacuum outlets so as to form an underpressure in the mould cavity, after which a supply of liquid resin is supplied via the resin inlets. The resin is forced into the mould cavity due to the pressure differential and impregnates the fibre material of the fibre mats. When the fibre material has been fully impregnated, the resin is cured in order to form the final composite structure, i.e. the wind turbine shell part.

Many of the above processes including the layout of the fibre mats are usually carried out manually.

Wind turbine blades have become increasingly longer of the years and blades having a length of more than 70 metres are now commercially available on the market. This also means that larger moulds have to be used. Due to the large size, it has become increasingly complicated to lay out the fibre mats and further to obtain proper wetting of the fibre material. None the less, many of the different processes are still carried out manually, which increases the risk of errors occurring, such as formation of wrinkles in the fibre material or areas of insufficient wetting of the fibre material, which in turn can be detrimental to the mechanical strength of the composite structure and may necessitate that the manufactured wind turbine blade shell part has to scrapped. Further, the cycle time for each process, i.e. laying up fibre material, impregnating the fibre material and curing the resin to form the final product, all increase.

DISCLOSURE OF THE INVENTION

Accordingly, there is a need for systems and methods that will improve the quality of the wind turbine blade shell parts (or at least decrease the risk of errors occurring) and that can lower the cycle time of the various processes.

According to a first aspect, the invention provides a fibre mat layup system for laying up and cutting fibre mats in a mould for the manufacture of a fibre-reinforced composite part, in particular a part for a wind turbine blade, such as an aerodynamic shell part, wherein the system is adapted to laying up the fibre mat as it is moved in a longitudinal direction along the mould, and wherein the system comprises: a first drive roller for advancing the fibre mat, a cutting device for cutting the fibre mat, a first clamping device for clamping the fibre mat, while the fibre mat is being cut by the cutting device, a buffer roller providing a buffer length for the fibre mat and being arranged downstream of the first drive roller, the first clamping device and the cutting device, the buffer roller being movable so as to vary the buffer length of the fibre mat, and a second drive roller for advancing the fibre mat and being arranged downstream of the buffer roller.

This provides for a system, where the fibre mat may continue to be laid up, while the fibre mat is being cut. This may be carried out by the first clamping device immobilising a first part of the fibre mat, while the fibre mat is being cut. The system continues to propagate along the mould and laying up the fibre mat. This can be carried out, since the second drive roller continues to advance the fibre mat and the buffer roller position is varied so as to decrease the buffer length. Thereby, the layup cycle time will not be affected by the cutting process time. The fibre mat layup system lays up the fibre mat by moving along the mould as opposed to systems utilising a gripper that pulls the fibre mat along the mould.

Accordingly, the drive rollers of the fibre mat layup system also advances the fibre mat with approximately the same speed as the layup system is moved along the mould. Otherwise, the fibre mat would either be dragged along the mould or tend to wrinkle during layout.

The cutting position of course determines the total length of the fibre mat being laid out.

The drive rollers are defined as devices that may advance the fibre mats internally in the fibre mat layup system. The drive roller may be formed by a single roller or two or more rollers engaging the fibre mat. The drive roller may also comprise a belt a belt and plurality of rollers rotating the belt.

According to an advantageous embodiment, the fibre mat is supplied from a fibre mat roll. The fibre mat roll is preferably moved along the mould together with the fibre mat layup system. However, in principle, the fibre mat roll may also be stationary.

According to another advantageous embodiment, the system further comprises a draping device arranged downstream of the second drive roller. The draping device ensures that wrinkles in the laid up fibre mats are reduced and aligns the fibres in the correct orientation. This is particular relevant, if the advancement speed from the drive rollers is not exactly aligned with the movement speed of the fibre mat layup system along the mould. In one embodiment, the draping device comprises one or more rollers, such as a compression roller. Alternative or in addition thereto, the draping device may draping device comprises a number of brushes or pads. The brushes may for instance be flexible rubber pads that are dragged along with the fibre mat layup system, thus draping the fibres as they are moved along the fibre layers.

According to one advantageous embodiment, the cutting device is an ultrasonic knife. The cutting device may also be a rotary cutter. In principle any cutting device suitable for cutting fibre mats may be used.

In another advantageous embodiment, the system is adapted to lay out fibre mats having a width of at least 20 cm. In other words, the fibre mat has a width of at least 20 cm. Alternatively, the fibre mat has a width of at least 30 cm, or at least 40 cm, or at least 50 cm. The system may also be adapted to lay up fibre mats having a width of between 20 cm and 80 cm. Thus, the fibre mats may have a maximum width of 80 cm.

The fibre mats may comprise any type of reinforcement fibres suitable for reinforcing large composite structures, such as glass fibres, carbon fibres or aramid fibres. The fibre mats may comprise unidirectional fibres, biaxial fibres, triaxial fibres or randomly oriented fibres.

In yet another advantageous embodiment, the system is adapted to lay up fibre mats with a speed of between 25 m/minute and 100 m/minute. Alternatively, the system is adapted to lay up fibre mats with a speed of between 50 m/minute and 100 m/minute, e.g. around 72 m/minutes (or in other words 1.2 m/s).

According to one embodiment, the system is adapted slow down its movement speed along the movement during cutting of the fibre mat.

In one advantageous embodiment, the first drive roller is arranged substantially vertical above the second drive roller, and preferably also substantially vertical above the first clamping device. This provides for a simple solution of advancing the fibre mat from the first drive roller to the second drive roller, after the fibre mat has been cut. The buffer roller may advantageously be arranged so as to be movable in a direction substantially transverse to the direction between the first drive roller and the second drive roller. Thus, the buffer roller may for instance be movable in a substantially horizontal direction. This provides for a simple solution of providing and varying the buffer length of the fibre mat.

According to a particular advantageous embodiment, the buffer roller is resiliently biased. Thus, the buffer may biased with a bias force that exceeds the pulling force from the fibre mat, when the first clamping device is disengaged. Once the first clamping device is engaged, the second drive means will continue to advance the fibre mat, which in turn will apply a pulling force to the buffer roller. Since the pulling force exceeds that of the bias force, the buffer roller will be moved an in turn decrease the buffer length. The buffer roller may for instance be biased by use of gas pressure or by use of a spring.

In one embodiment, the buffer roller may be locked in a disengaged position, where the buffer length is minimised. The buffer length may for instance be zero, when the buffer roller is locked in the disengaged position. The buffer roller may be locked in a position, where the cut fibre end may be advanced passed the buffer roller to as to be advanced to a degree where the fibre mat again engages the second drive roller. This can be carried out by having suitable means for guiding the fibre mat past the buffer roller, or e.g. by having the first drive means and the second drive means being arranged substantially above each other. Afterwards, the buffer roller may be moved to the biased position again to provide a new buffer length.

The first clamping device may comprise clamping rollers. In one embodiment, the fibre mat layup system is provided with sensors that used to monitor the tension of the fibre mat. This may in turn be used to control the bias force applied to the buffer roller.

According to a first additional aspect, the invention also provides a method of manufacturing a composite part, in particular a part for a wind turbine blade, such as an aerodynamic shell part, wherein fibre mats are laid up in a mould part in a layup procedure by use of an automated fibre mat layup system, wherein the layup procedure comprises the steps of: a) delivering a supply of one or more fibre mats to the fibre mat layup system, b) laying up a first length of a fibre mat onto a surface of the mould along a first longitudinal part of the mould by moving the fibre mat layup system in a longitudinal direction of the mould, c) clamping a first part of the fibre mat, d) cutting the fibre mat at a cutting position, and while step d) is carried out e) laying up a second length of the fibre mat by continuing to move the fibre mat layup system along the mould, while a buffer length arranged downstream of the first part of the fibre mat is being reduced, and f) repeating steps a)-e) to define a plurality of laid out fibre mats defining the composite part.

Thus, the method involves the continuing steps of laying up and cutting fibre mats, which are arranged and overlapped so as to cover the intended part of the mould and stacked until a desired laminate thickness is obtained. The method allows the fibre mat to be continued to be laid out during the cutting step, thereby not adversely affecting the layup cycle time. The fibre mat layup system may be moved to a new start position for laying out the next fibre mat length, while the next piece of fibre mat is delivered to the fibre mat layup system.

In one advantageous embodiment, the buffer length in step f) is reduced by varying the position of a buffer roller, the buffer roller providing a buffer length for the fibre mat.

In another advantageous embodiment, delivery of the one or more fibre mats in step a) involves advancing the one or more fibre mats to a position, where they extend from a first drive roller to the buffer roller arranged downstream of the first drive roller and further onto a second drive roller arranged downstream of the buffer roller. This ensures that the fibre mat may still be advanced, once it has been cut in step d).

In yet another advantageous embodiment, the delivery is carried out while the buffer roller is in a retracted position, and wherein the first drive roller advances the fibre mat until it engages the second drive roller. Thus, the fibre mat may be advanced passed the roller. The buffer roller may subsequently be moved to an engaged position, wherein the drive roller provides the buffer length of the fibre mat.

According to an advantageous embodiment, the fibre mat layup system after step e) is moved to a new start position for laying out a fibre mat, while a subsequent delivery of a supply of one or more fibre mats to the fibre mat layup system fibre mat is carried out.

In one embodiment, the fibre mat layup system during step b) is moved along the mould at a first speed, and the fibre mat layup system is in step e) is moved along the mould at a second speed being lower than the first speed.

In one embodiment, sensors are used to monitor the tension of the fibre mat. This may in turn be used to control the bias force applied to the buffer roller.

In one embodiment, the fibre mat layup system is turned between laying out a fibre fibre mat and a second fibre mat. Thus, the first fibre mat is laid out in the longitudinal direction of the mould, whereas the next is laid out in the opposite direction. Alternatively, the fibre mat layup system is moved back to start of layup of the next fibre mat and laid out in the same direction.

According to a second aspect, the invention provides a method of manufacturing a wind turbine blade shell part made of a composite structure comprising a fibre-reinforcement material embedded in a polymer matrix, wherein the method comprises the steps of: a) arranging one or more outer fibre layers on a mould surface, the one or more outer fibre layers defining an outer surface of the wind turbine blade shell part, b) mounting a plurality of fastening devices on a mounting plate so as to form a root end assembly, c) arranging the root end assembly on top of the one or more outer fibre layers at a root end section of the mould, d) arranging one or more inner fibre layers on top of the root end assembly, e) supplying a polymer to the outer and inner fibre layers, f) allowing the polymer to cure so as to form the composite structure, and removing the mounting plate.

This provides for a method, wherein the plurality of fastening devices can be arranged in the mould in a single step instead of the prior art method, where the fastening devices are arranged separately. The prior art method of separately arranging the bushings on the mould is a tedious procedure and is proned to error. By use of the method according to the invention, the fastening devices or bushings may be arranged on the mounting plate, and all the bushings may then be arranged correctly on the fibre layers on the mould. This also speeds up the manufacturing process, since all the fastening members may be arranged on the fibre material in one step, and since fibre layup in the mould and the preparation of root end assembly may be prepared in parallel.

The fastening members are in the final composite structure of the shell part embedded between the outer fibre layer(s) and the inner fibre layer(s). The fastening members are accessible from the root end of the shell part so that the wind turbine blade may be mounted to the hub of a wind turbine.

The mounting plate may remain on the root end of the wind turbine blade shell part after the manufacture of the shell part and only be removed prior to installment on the wind turbine hub. Thereby, the rigid mounting plate ensures that the root end of the blade does not deform during storage. In manufacturing methods, where the blade shell is manufactured via two or more blade shell parts, such as the suction side shell part and the pressure side shell part, the mounting plate may also remain attached to the blade shell parts during the step, where the blade shell parts are glued to each other.

When the mounting plate of the root end assembly has been removed, the remaining part constitutes a root end insert.

According to a preferred embodiment, the fastening members are bushings. The bushings are arranged so that the opening of the bushings are accessible from the root end of the blade shell so that the final wind turbine blade may be mounted to the hub of a wind turbine by use of stay bolts inserted into the openings of the bushings.

According to an advantageous embodiment, the bushings are mounted on the mounting plate by use of stay bolts. The mounting plate may be provided with openings for the stay bolt to be inserted through, so that the bushings are mounted on a first side of the mounting plate, and the stay bolts are inserted through said openings and attached to the bushing from a second, opposite side of the mounting plate. The mounting plate may be removed from the root end by first demounting the stay bolts and then removing the mounting plate from the root end of the blade shell part.

According to another advantageous embodiment, the mounting plate is provided with guiding recesses for insertion of one end of the fastening members. This ensures correct alignment and orientation of the fastening members.

In yet another advantageous embodiment, the preparation of the root end assembly further comprises the step of mounting inserts between the fastening members. The inserts may for instance be retaining inserts, such as butterfly wedges, which retain the fastening members and further ensures that the fastening members are arranged with the correct mutual spacing. In practice, the fastening members and the inserts may be arranged on the root end assembly by alternately arranging the fastening member and the inserts, preferably along a circular or semi-circular path on the mounting plate.

The inserts may advantageously be made of a fibre-reinforced composite structure, e.g. a fibre pultrusion comprising pultruded glass fibres or carbon fibres.

In one embodiment, fibre material is wrapped around the fastening members. The fibre material may advantageously be non-woven fibre material, such as glass wool.

The fastening members are typically made of a metal, such as cast iron or stainless steel, and by wrapping fibre material, e.g. glass fibres, around the fastening members, it is ensured that the fastening members are properly bonded to the inner and outer fibre layers.

In one advantageous embodiment, a wedge is arranged in longitudinal extension of the fastening member. The wedge may for instance be made of foamed polymer or balsawood. The wedge is arranged so that it has the thickest part proximal to the end of the fastening member, and the thin part distal to the end of the fastening member. This ensures that the root end assembly has a gradual transition to the outer and inner fibre layers, in turn ensuring that the blade root does not have a steep or discontinuous stiffness transition.

The wedge may be wrapped in the fibre material together with the fastening member so that the two parts may be arranged on the mounting plate together. The wedge may also in principle be integrally formed with the fastening member.

In another advantageous embodiment, the inserts comprises a tapered part or wedge part. The tapered part of the insert may preferably be aligned with the wedge arranged in longitudinal extension of the fastening member. Thereby, the two parts together ensure a gradual stiffness transition in the composite structure of the shell part.

A fibre material may advantageously be weaved between the wedges of the fastening members and the wedge part of the inserts. This can be done by weaving the fibre material under the butterfly wedges and over the fastening member wedges or vice versa. The fibre material may for instance be triaxial glass fibre mats.

In yet another advantageous embodiment, a fibre layer, such as a fibre mat, is wrapped around the plurality of fastening members and the optional inserts prior to the root end assembly being arranged in the mould. The fibre layer may for instance be a triaxial fibre mat comprising glass fibres.

Further, a number of fibre bands may be arranged on top of the wedges in order to a proper alignment of the end parts of the edges and a proper draping of the fibre material, thus ensuring a proper transition to the inner and outer fibre layers without wrinkles forming in the laminate.

The outer fibre layer(s) may advantageously comprise biaxial fibre mats. The inner fibre layer(s) may advantageously comprises triaxial fibre mats.

According to the second aspect, the invention also provides a root end assembly comprising a mounting plate comprising a first side and a second side, and a plurality of fastening members, such as bushing, mounted to the first side of the mounting plate so that the fastening members extend substantially normal to first side of the mounting plate, wherein the mounting plate is adapted to be removed, when the root end assembly has been mounted in a wind turbine blade shell part.

Thus, it is seen that the root end assembly corresponds to the intermediate product obtainable by step b) of the method according to the invention.

According to an advantageous embodiment, the assembly further comprises a number of inserts arranged between the fastening members. Thereby, the fastening members and the inserts may together form a root end insert that is embedded in the entire cross-section, thus forming a circular insert in the finished wind turbine blade shell. The inserts and the fastening members preferably comprise lateral sides that abut each other.

The fastening members may advantageously be made of metal, such as cast iron or stainless steel.

According to an advantageous embodiment, the assembly further comprise wedges arranged in longitudinal extension of the fastening members, alternatively the wedges being provided with a tapering part proximal to the mounting plate. Similarly, the inserts may comprise a tapering part proximal to the mounting plate. The wedges or tapering parts may thus provide for a gradual stiffness transition in the longitudinal direction of the finished wind turbine blade shell.

According to another advantageous embodiment, the mounting plate on the first side comprises recesses or notches, and a proximal end of the fastening members are arranged in said recesses or notches. The recesses may assist in ensuring that the fastening members are arranged correctly on the mounting plate, e.g. ensuring that the fastening members extend along a normal to a plane of the mounting plate. The recesses are preferably disposed along a circular path or semi-circular path on the mounting plate so that the fastening members are arranged along a circular cross section of the wind turbine blade shell part.

According to yet another advantageous embodiment, the mounting plate further comprises a number of holes, wherein the fastening members are attached to the mounting plate by stay bolts that have been inserted from the second side of the mounting plate and through the holes. Thus, the holes are preferably also disposed along a circular path. Preferably, the holes are aligned with the recesses on the first side of the mounting plate.

In one embodiment, the mounting plate is provided with attachment devices for attaching the mounting plate to the lowering device. The attachment devices may for instance be pins that may mate or rest on hooks provided on the lowering device.

According to a third aspect, the invention provides a mould for manufacturing a wind turbine blade shell part, the mould being provided with a moulding surface that defines the outer shape of the wind turbine shell part, wherein the mould has a longitudinal direction and comprises a root end mould part at a longitudinal end thereof, and wherein the mould is provided with a lowering mechanism, which is adapted to carry and lower a root end insert onto the moulding surface of the mould.

This ensures that a root end insert that has been separately prepared may be lowered and arranged very precisely onto the moulding surface. Further, the lowering process can to a high degree be carried out without human involvement. Hitherto, root end inserts have been mounted manually, and the quality of the process therefore heavily relied on the skills of the operator. By using an automatic lowering mechanism it is ensured that the root end insert is lowered into the mould every time such a root end insert is being mounted. Safety is also increased, as there is no manual operation for fixing the root plate, while the root end insert is being carried by a carrying device, such as a crane.

In practice, the root end insert may be arranged on a mounting plate, the mounting plate and the root end insert together forming a root end assembly. The root end insert is then arranged in the mould by providing the root end assembly on the lowering device and lowering it into the mould. The mounting plate may then later, e.g. after moulding, be removed.

The lowering mechanism may advantageously be attached to the mould, preferably on the sides of the mould. This ensures that the lowering mechanism is always aligned in the same way relative to the mould, in turn ensuring that the root end insert is lowered onto the moulding surface in the same way every time.

According to an advantageous embodiment, the lowering mechanism is adapted to lower the root end insert in a two-step motion, where the root end insert in a first motion step is lowered onto the moulding surface while the root end insert is angled upwards in the longitudinal direction until a first end of the root end insert contacts a part of the moulding surface at the root end, and where the root end insert in a second motion step is tilted until the root end insert rests on the moulding surface. Thereby, the lowering mechanism may lower the root end insert onto the moulding surface without wrinkling or otherwise distorting fibre material, such as fibre mats, that have been laid up on the moulding surface prior to arranging the root end insert in the mould.

The root end insert is in the second motion step rotated substantially about the first end of the root end insert or the part that after the first motion step contacts the part of the moulding surface at the root end.

According to an advantageous embodiment, the lowering mechanism comprises a frame for carrying the root end insert and a driving means for lowering the frame together with root end insert. This provides for a simple solution, where the root end insert or root end assembly may be arranged on the frame, and where the driving means facilitate the lowering motion, where the root end insert is arranged on the moulding surface.

According to another advantageous embodiment, the lowering mechanism comprises at least a pair of guiding pins or rollers and mating guiding slots provided on the frame.

The mating connection between the guiding pins and the guiding slots may thus ensure that the root end insert follows the correct motion, when it is lowered onto the moulding surface.

The guiding slots may advantageously comprise a front guiding slot and a rear guiding slot, wherein the slots are shaped so that rear guide in the first motion lowers a rear part of the frame faster than the a front guiding slot lowers a front part of the frame. Thereby the frame will be both lowered and tilted during the first motion step, thus tilting the root end insert upwards as seen in the longitudinal direction of the mould.

In one advantageous embodiment, the slots are shaped so that the front guide in the second motion lowers the front part of the frame faster than the rear guiding slot lowers the rear part of the frame. Thus, the guiding slots are shaped so as to provide the rotating motion of the second motion step.

In another advantageous embodiment, the driving means comprises a telescopic piston cylinder, such as a hydraulic or pneumatic piston. This provides a particular simple solution for moving the frame and thus lower the root end insert onto the moulding surface.

In yet another advantageous embodiment, the frame is provided carrying means for carrying the root end insert. This provides a simple solution for arranging and carrying the root end insert on the frame of the lowering device. The carrying means may for instance be hooks that are adapted to receive pins or rods from the root end insert. The root end insert or more precisely the mounting plate of the root end assembly may thus rest on the hooks.

According to the third aspect, the invention also provides a method of manufacturing a wind turbine blade shell part, wherein the wind turbine blade shell part is manufactured as a composite structure comprising a fibre-reinforcement material embedded in a polymer matrix, and wherein the wind turbine blade shell part is provided with a root end insert that, when manufactured, is accessible from a root end of the wind turbine shell part, and wherein the wind turbine blade shell part is manufactured in a mould provided with a moulding surface that defined an outer shape of the wind turbine blade shell part, wherein the method comprises the steps of: a) arranging the root end insert on a lowering device of the mould, and b) lowering the root end insert onto the moulding surface of the mould via the lowering device.

This ensures that a root end insert that has been separately prepared may be lowered and arranged very precisely onto the moulding surface. Further, the lowering process can to a high degree be carried out without human involvement. By using an automatic lowering mechanism it is ensured that the root end insert is lowered into the mould every time such a root end insert is being mounted. Safety is also increased, as there is no manual operation for fixing the root plate, while the root end insert is being carried by a carrying device, such as a crane.

The lowering mechanism is advantageously arranged on the mould, e.g. on the sides of the mould.

In an advantageous embodiment, step b) is carried out in two motions steps, wherein b1) the root end insert in a first motion step is lowered onto the moulding surface while the root end insert is angled upwards in the longitudinal direction until a first end of the root end insert contacts a part of the moulding surface at the root end, and b2) the root end insert in a second motion step is tilted until the root end insert rests on the moulding surface. Thereby, the root end insert may be lowered onto the moulding surface without wrinkling or otherwise distorting fibre material, such as fibre mats, that have been laid up on the moulding surface prior to arranging the root end insert in the mould. The root end insert is in the second motion step rotated substantially about the first end of the root end insert or the part that after the first motion step contacts the part of the moulding surface at the root end.

According to a particular advantageous embodiment, the root end insert prior to step a) is arranged on a mounting plate, and the root end insert is arranged on the lowering mechanism via the mounting plate.

The mounting plate together with the root end insert form a root end assembly.

The root end insert may comprise a plurality of fastening members, such as bushings. The fastening members are accessible from the end of the wind turbine blade shell so that the fastening members in the final wind turbine blade can be used to mount the root end of the wind turbine blade to the hub of a wind turbine. The root end insert further comprises a number of inserts arranged between fastening members.

As previously mentioned, the lowering mechanism comprises a frame for carrying the root end insert and a drive device for lowering the frame together with root end insert. The frame and the root end insert may be lowered onto the moulding surface of the mould via guiding slots and guiding pins or rollers.

According to an advantageous embodiment, the method prior to step a) comprises the step of arranging one or more outer fibre layers on the moulding surface, the one or more outer fibre layers defining an outer surface of the wind turbine blade shell part. According to another advantageous embodiment, the method additionally comprises the step of arranging one or more inner fibre layers on top of the root end insert.

Thereby, the root end insert is sandwiched between the inner fibre layer(s) and outer fibre layer(s).

According to yet another advantageous embodiment, the method after step b) comprises the steps of supplying a polymer to the outer and inner fibre layers, and allowing the polymer to cure so as to form the composite structure. The root end insert is thus embedded in the composite structure, thus providing a strong attachment part for mounting the final wind turbine blade to the hub of a wind turbine.

In methods where the root end insert is arranged on the moulding surface by use of a mounting plate, the mounting plate may be removed after the polymer has cured.

The various embodiments of the three aspects may be combined in any way. For instance may the root end assembly of the second aspect be arranged on the lowering mechanism of the third aspect. This can for instance be carried out by the root end insert being arranged on a mounting plate, the root end insert and the mounting plate together forming the root end assembly.

BRIEF DESCRIPTION OF THE DRAWINGS

The invention is explained in details below with reference to an embodiment shown in the drawings, in which.

DETAILED DESCRIPTION OF THE INVENTION

Figure 1:
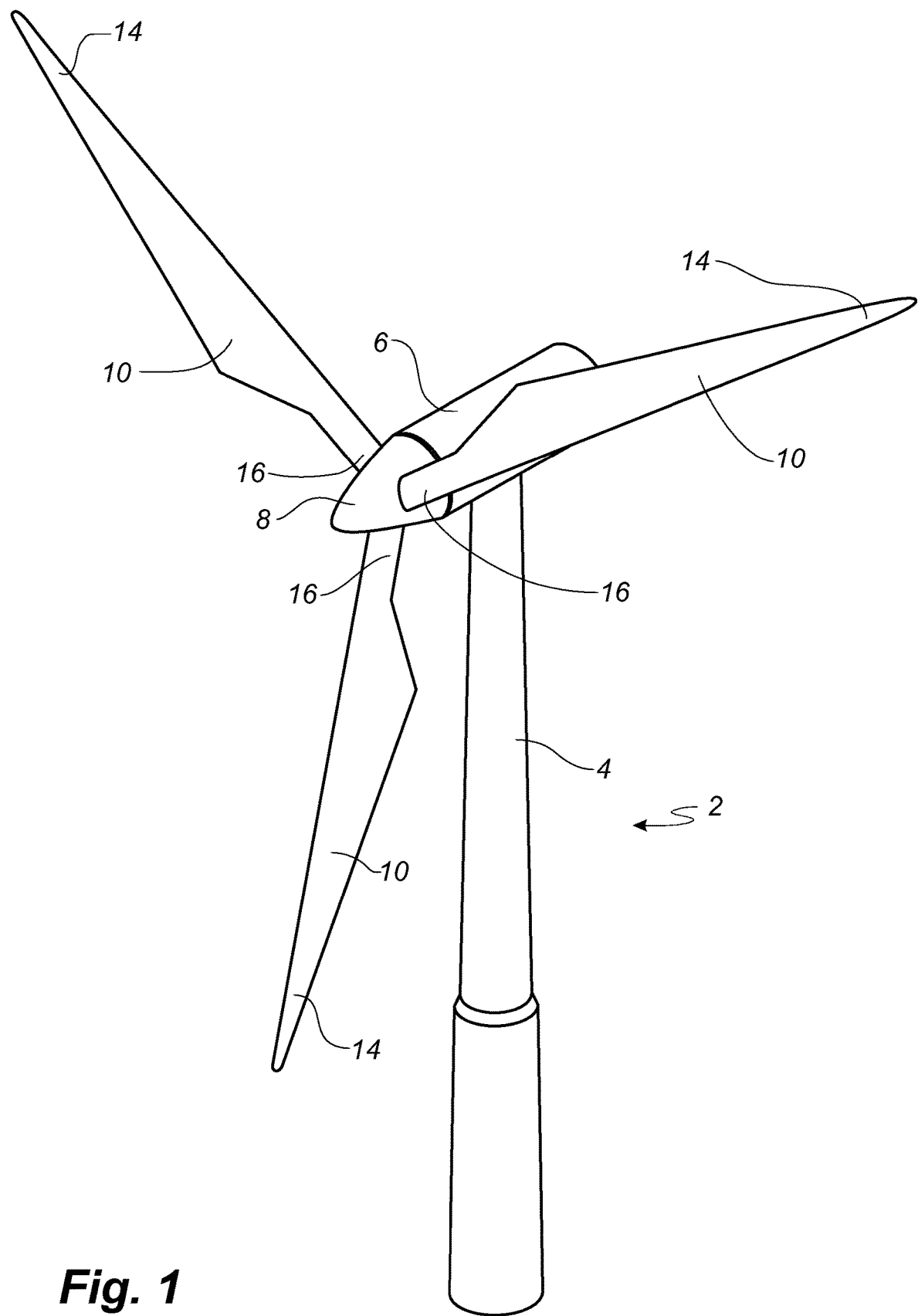
FIG. 1 shows a schematic view of a wind turbine provided with three wind turbine blades, at least one of these blades having a blade shell half being produced according to the method according to the invention

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
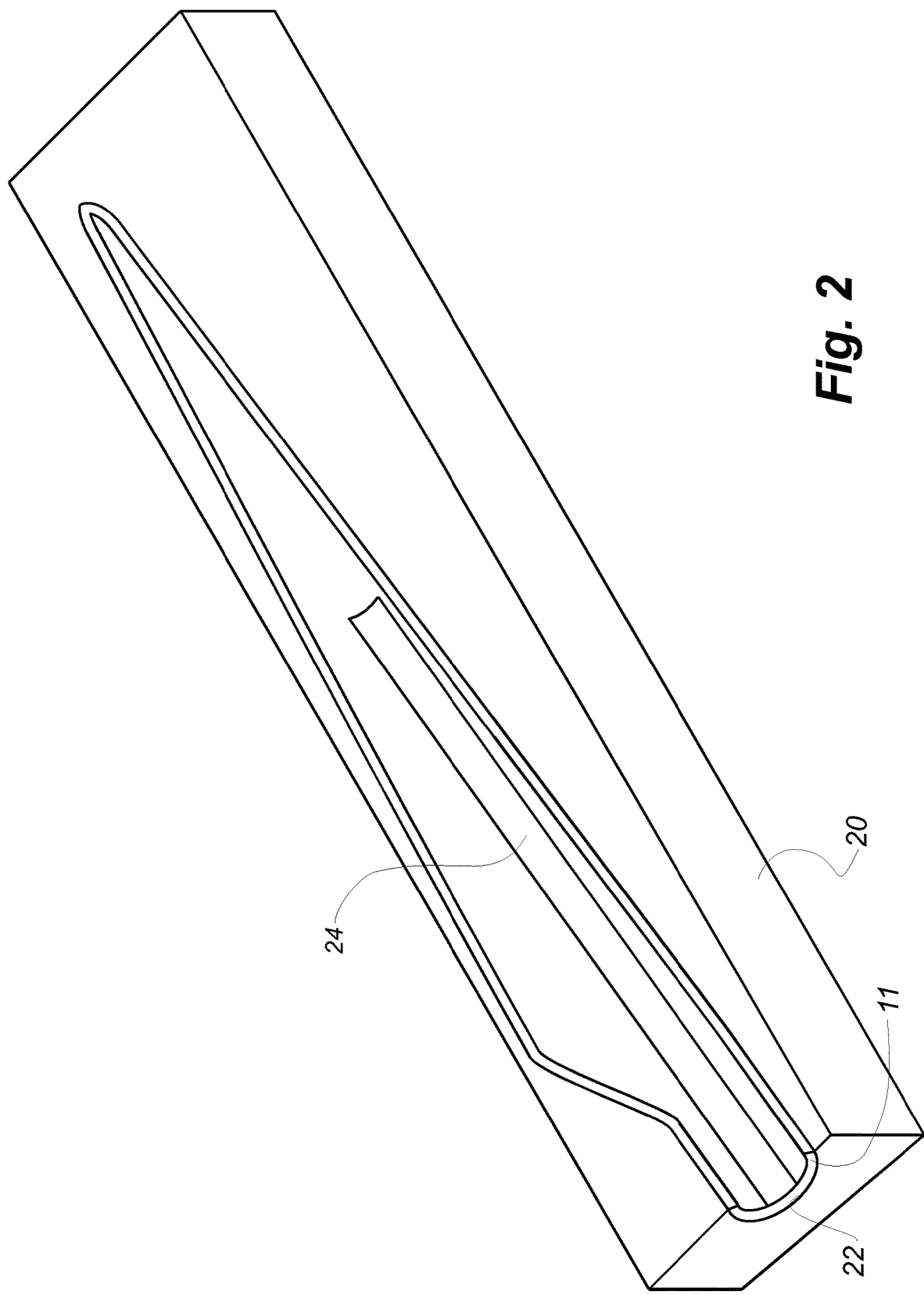
FIG. 2 shows a schematic view of a mould used for manufacturing a wind turbine blade shell part

The wind turbine blades 10 are manufactured as fibre-reinforced composite structures comprising a fibre-reinforcement material embedded in a polymer matrix. The individual blades 10 comprise an aerodynamic shell, and the suction side and the pressure side of the aerodynamic shell are often manufactured as separate parts in moulds 20 as shown in FIG. 2. The blade shell parts 11 are manufactured separately by arranging the fibre-reinforcement material and typically also sandwich core material, such as foamed polymer or balsawood, on a mould surface 22 of the mould. The fibre reinforcement material is laid out as separate fibre mats 24 that are stacked overlapping on the mould surface 22. The load bearing structure of the blade 10 may be manufactured as a spar cap integrated in the blade shell, also called a main laminate, with shear webs arranged between the spar caps of the pressure side shell part and the suction side shell part. Alternatively, the load bearing structure may be formed as a spar or a beam, and the aerodynamic shell is adhered to the load bearing structure. The two blade shell parts are also glued to each other, e.g. by use of internal flange parts. The fibre mats 24 may be laid up manually on the mould surface 22 or by use of a fibre mat layup system, in which case the fibre mats 24 may be laid up automatically or semiautomatically.

Figure 3:
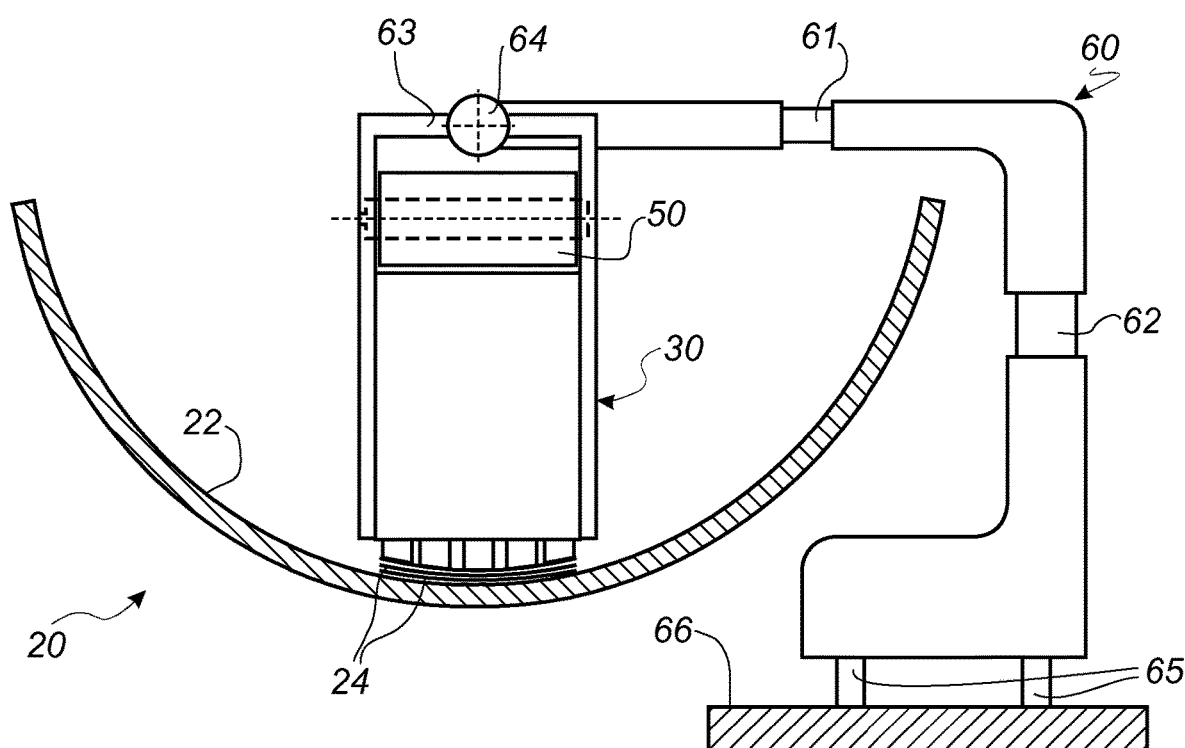
FIG. 3 shows cross-sectional view of the mould a system according to the invention for automated layup of fibre mats.

FIG. 3 shows a cross-section of the mould 20 in a manufacturing setup, where a fibre mat layup system 30 is utilised to lay up the fibre mats 24. The fibre mat layup system 30 is carried on a frame 63 and the fibre mats 24 are laid up by the fibre mat layup system 30 being moved along the mould 20 by use of a cart or portal 60. The fibre mat material is delivered to the fibre mat layup system 30 from a fibre mat roll 50 that also is carried on the frame and thus is moved together with the fibre mat layup system 30 along the mould. The portal 60 comprises a first telescopic portion 61 and a second telescopic portion 62 so that the transverse position and the height of the frame 63 and thereby also the fibre mat layup system 30 may be varied. Further, the frame may be rotated about a pivot 64m, whereby the layup angle of the fibre mats 24 may be varied.

Thereby, the position and angle of the fibre mat layup system 30 can be varied in order to lay out the fibre mats at the desired position and to accommodate the shape of the mould surface 22. The position and angle of the fibre mat layup system 30 may be preprogrammed so that the fibre mats 24 may be cut and laid up in an automated or semiautomated process. The portal may for instance be moved across the factory floor 66 by use of rails or wheels 65.

Figure 4:
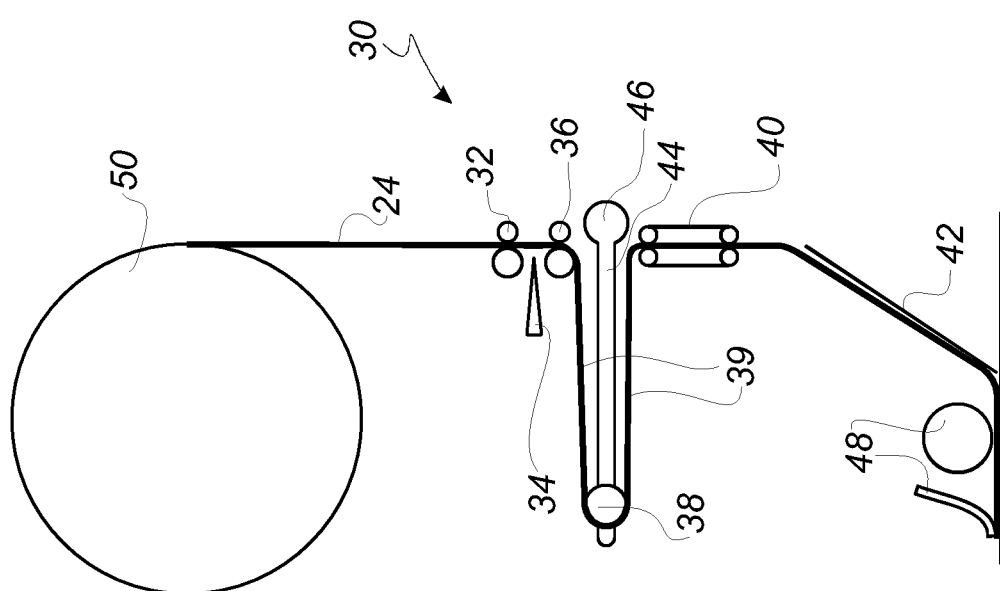

FIGS. 4-10 show side views of the fibre mat layup system 30 during a layup and cutting procedure according to the invention. As shown in FIG. 4, the fibre mat 24 is supplied to the fibre mat layup system 30 from the fibre mat roll 50. The fibre mat layup system 30 comprises a first drive roller 32 that advances the fibre mat 24 within the fibre mat layup system 30. A cutting device 34 for cutting the fibre mat 24 is arranged downstream of the first drive roller 32. The cutting device 34 may for instance be a sonic knife or a rotary cutter. A buffer roller 38 is arranged downstream of the cutting device 34 and provides for a buffer length 39 of the fibre mat. The buffer roller 38 is arranged in slots 44 so that the buffer roller 38 may be moved in a substantially horizontal direction so that the buffer length 39 may be varied, and the buffer roller is resiliently biased, e.g. by air pressure to provide the buffer length 39. A first clamping device 36 is arranged between the cutting device 34 and the buffer roller 38.

A second drive roller 40 for advancing the fibre mat 24 within the fibre mat layup system 30 is arranged downstream of the buffer roller 38 and buffer length. The first drive roller 32 and the second drive roller 40 are arranged substantially vertically above each other. Thus, the buffer roller position is variable in a position substantially transverse to the general direction of fibre mat advancement, which in turn provides a simple solution for varying the buffer length 39.

The speed of the first and the second drive rollers 32, 40 is generally aligned with the propagation speed of the fibre mat layup system 30 along the mould. This ensures that the fibre mats 24 can be arranged on the mould surface 22 without being dragged along the mould surface and without the fibre mats wrinkling. The fibre mat layup system 30 further comprises a tray 42 for arranging the fibre mats 24 on top of the mould surface 22. The tray may be angled so that the tension of the fibre mat is relieved as it is arranged on top of the mould surface 22. The fibre mat layup system 30 further comprises a draping device 48. The draping device 48 may for instance comprise one or more compression rollers. Alternative or in addition thereto, the draping device may draping device comprises a number of brushes or pads. The brushes may for instance be flexible rubber pads that are dragged along with the fibre mat layup system, thus draping the fibres as they are moved along the fibre layers.

The fibre mat 24 needs to be cut in order to provide the correct fibre mat length. The layout and cutting method according to the invention is thus carried out in two layup steps. In the first layup step, the fibre mat layup system 30 lays up a first length of the fibre mat onto the surface, in a sequence, where the fibre mat layup system 30 continues to advance the fibre mat 24 within the system and propagates along the mould. During the layup of the first length, the first drive roller and the second drive roller 32, 40 continues to advance the fibre length, and the pulling forces thus applied to the buffer roller 38 is lower than the biasing of the roller. Thereby, the buffer roller 38 is kept stationary so as to provide the full buffer length 39.

Figure 5:
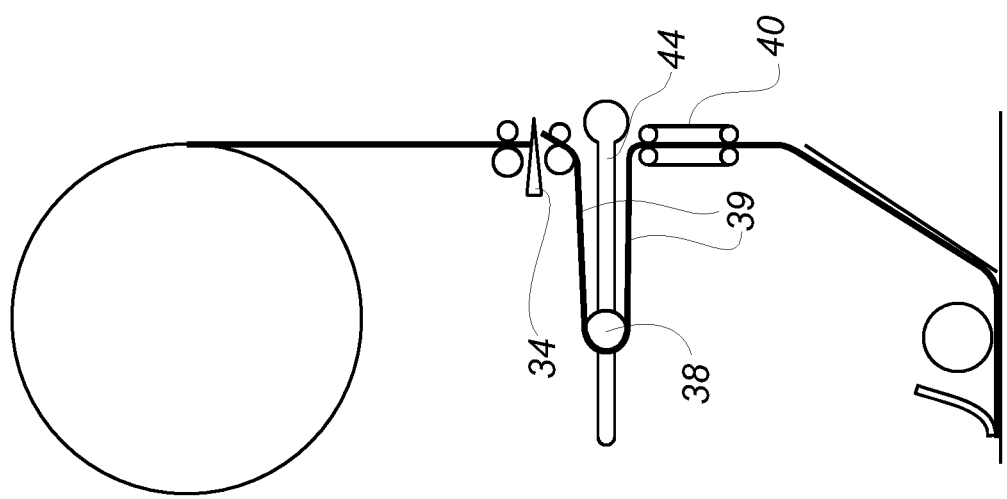

Once the fibre mat has been laid up to the first length, the second layup step commences. The first clamping device 36 clamps the fibre mat, thereby immobilising a part of the fibre mat, and the cutting device 34 is activated and cuts the fibre mat as shown in FIG. 5. The first drive means 32 may also be adapted to clamp the fibre mat in order to keep the fibre mat taut during the cutting procedure. Similarly, the first clamping device 36 may also be adapted to function as a drive roller, when the fibre mat is advanced internally in the fibre mat layup system 30.

Figure 6:
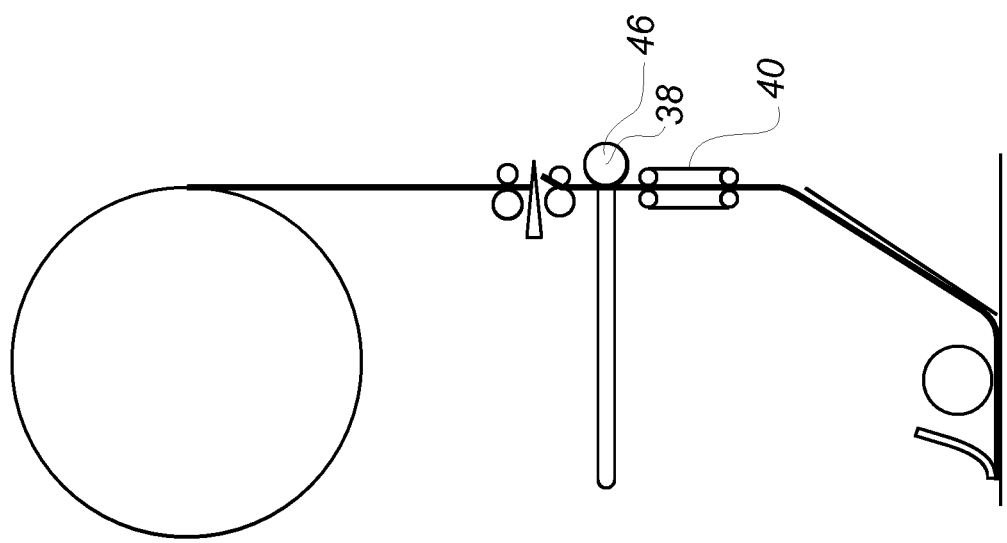
FIGS. 4-10 show side views of the system according to the invention during layup of fibre mats on the mould.

The fibre mat layup system continues to lay up a second length of the fibre mat 24 during the cutting procedure. The second length corresponds to the length of the fibre mat within the system 30 from the cutting device 34 to the layup point at the tray 42 at the time of cutting. Thus, the total length of the fibre mat laid up corresponds to the first length plus the second length. During the cutting procedure, the second drive roller 40 continues to advance the fibre mat. Since the clamping device 36 still clamps the end of the cut fibre mat, the fibre mat will begin to apply a pulling force to the buffer roller 38 which is larger than the bias. Accordingly, the buffer roller begins to move along the slots 44, thereby reducing the buffer length 39. This continues until the buffer roller 38 is retracted to a storage or retracted position 46, in which the buffer length 39 is minimised as shown in FIG. 6.

Figure 9:
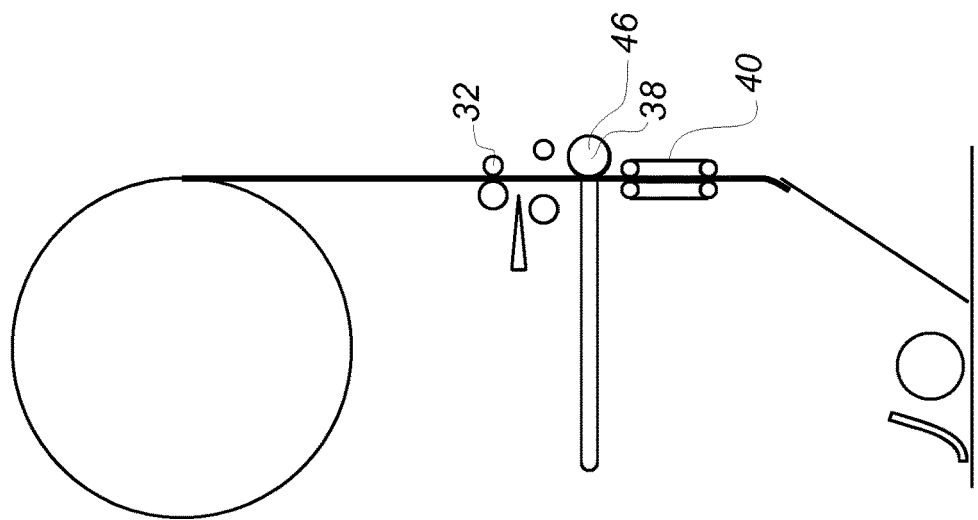
Figure 8:
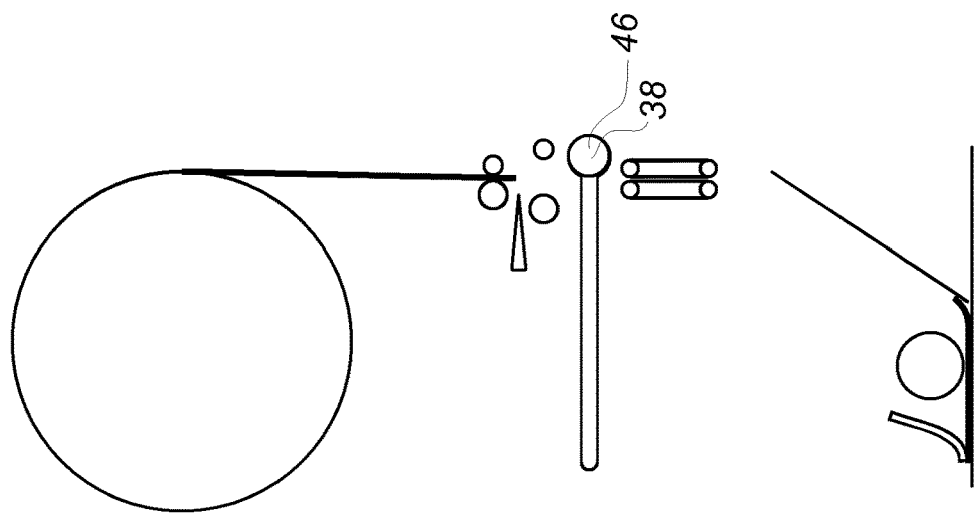
Figure 7:
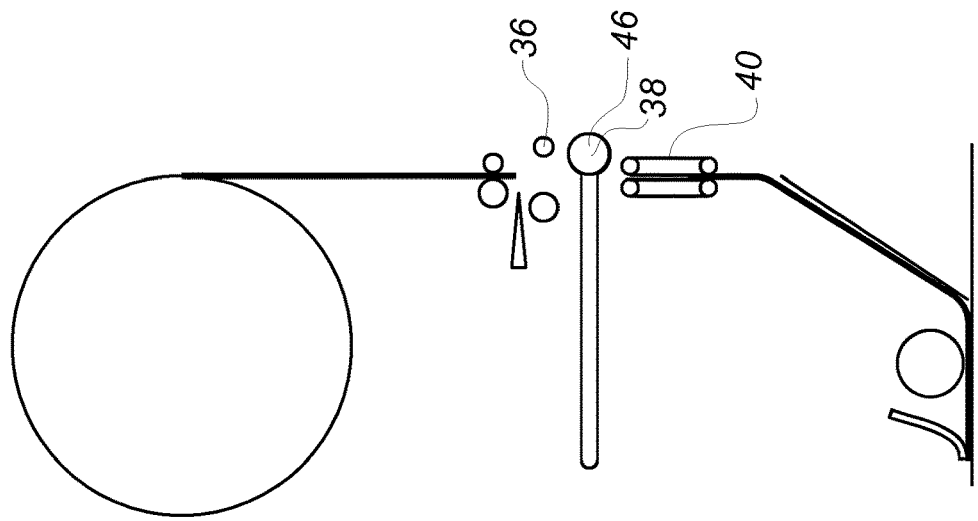
Figure 10:
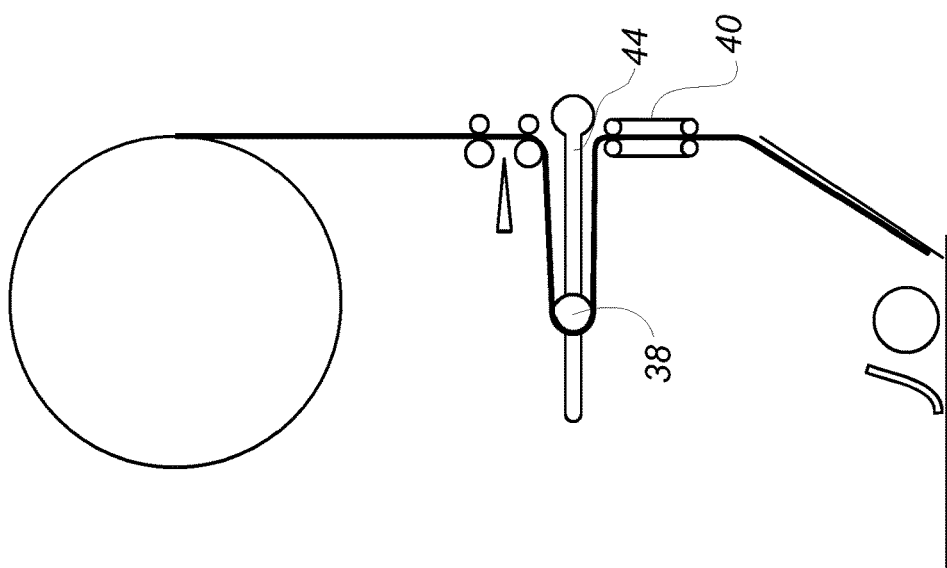

Then the clamping device 36 disengages the fibre mat so that the end of the fibre mat is pulled past the buffer roller as shown in FIG. 7, while the fibre mat layup system 30 continues to move along the mould and lay up the fibre mat on the mould surface 22 as shown in FIG. 9. The first drive roller 32 then starts to advance new fibre mat material from the fibre mat roll 50. The new fibre mat material is guided from the first drive roller 32 to the second drive roller 40. Since the buffer roller 38 is stored in the retracted position 46, the fibre mat material may be advanced past the buffer roller as shown in FIG. 9. When the new fibre mat material engages the second drive roller 40, the buffer roller may be engaged again so that the buffer length 39 may again be provided to the system by bias force moving the buffer roller along the slots 44 as shown in FIG. 10. The advancement of the fibre mat and the reengagement of the buffer roller 38 may be carried out while the fibre mat layup system is moved to the start position for the next fibre mat 24 to be laid up.

Overall, the fibre mat layup system 30 and the layup procedure according to the invention provide a system and method, where the layup cycle time is only minimally affected by the cutting process time.

The system is particularly suited for layup of fibre mats having a width of 20-80 cm. The fibre mats may comprise unidirectional, biaxial, triaxial or randomly oriented fibres. The reinforcement fibres are preferably glass fibres or carbon fibres. The layup of the first length of fibre mats may be carried out at a first movement speed, e.g. around 72 m/min. The layup of the second length of fibre mats, i.e. the layup during the cutting procedure, may be carried out at a lower speed. The speed may also be gradually reduced during the layup of the second length of the fibre mat.

Figure 11:
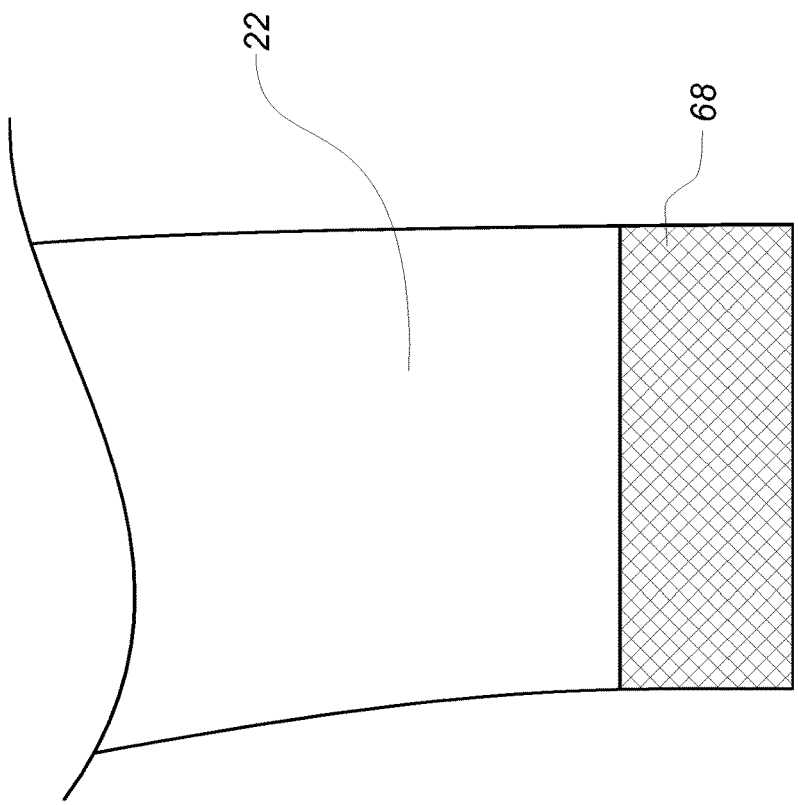
FIG. 11 shows a top view of a mould surface of the mould with outer fibre layers arranged on the mould surface.

In the following, the preparation and layup of the root part of the wind turbine blade shell will be described. As shown in FIG. 11, the layup procedure starts by arranging one or more outer fibre layers 68 on the mould surface 22 of the mould. The outer fibre layers 68 advantageously comprise biaxial fibre layers, e.g. with the fibres oriented −45 and 45 degrees compared to the longitudinal direction of the mould. The biaxial fibre layers provide a strong mechanical bonding to fastening members provided at the root end. The fastening members are in the final product, i.e. the wind turbine blade, used for mounting the root end of the blade to a wind turbine hub. The biaxial fibres provide strength both in the longitudinal direction and the transverse direction of the blade and thus help to ensure that the fastening members are not pulled out from the wind turbine blade root.

Figure 12:
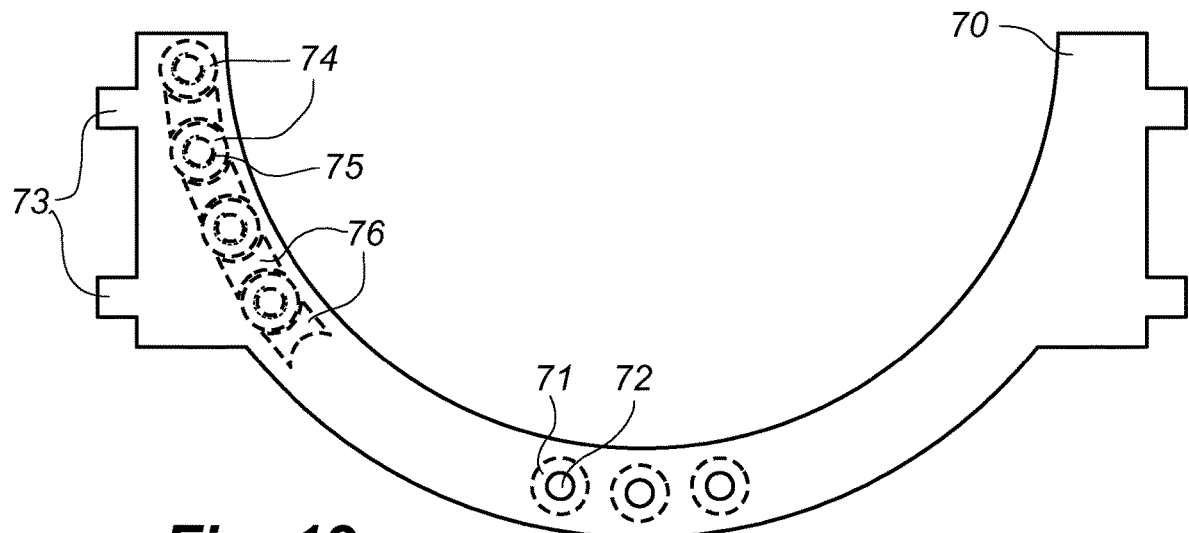
FIGS. 12 and 13 show schematic views of a mounting plate according to the invention for mounting a root end insert.
Figure 13:
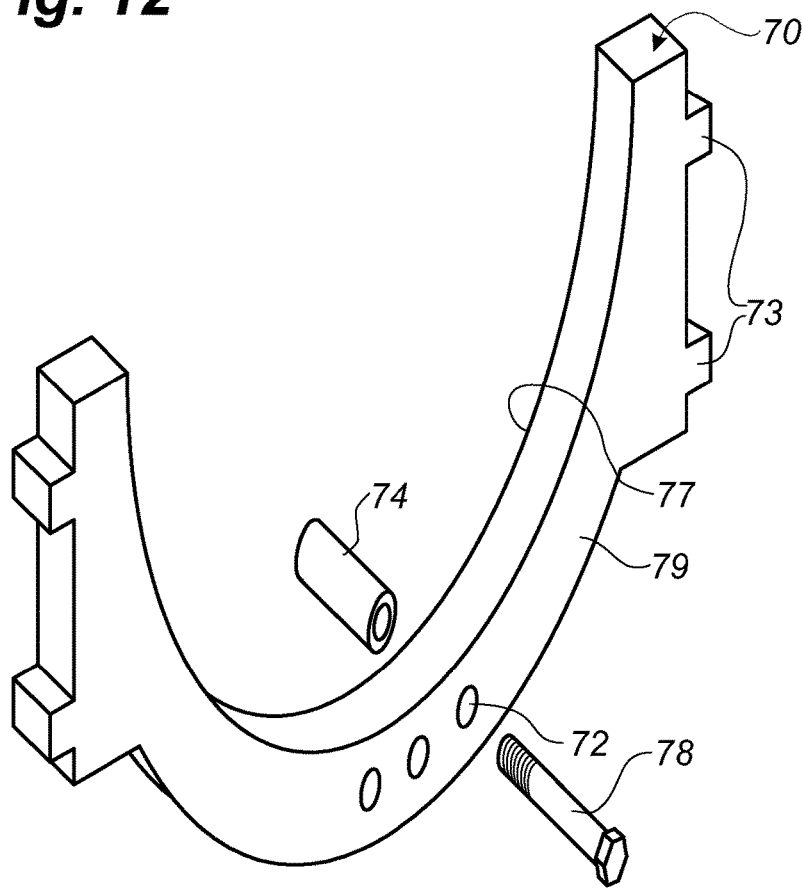

FIGS. 12 and 13 show a mounting plate 70 that is used to prepare a root end insert comprising a number of fastening members in form of bushings 74 and retaining inserts in form of butterfly wedges 76 arranged between the bushings 74. The mounting plate 70 together with the root end insert form a root end assembly. The mounting plate 70 may be used for arranging the root end insert on the mould surface 22 of the mould 20 and may be removed afterwards and at least prior to installment of the blade on a wind turbine hub.

The mounting plate 70 comprises a first side 77 and a second side 79. The mounting plate 70 is provided with a plurality of recesses 71 provided on the first side 77 of the mounting plate 70 and a plurality of through-going bores 72 or holes. The bores 72 are centrally aligned with the recesses 71. In FIGS. 12 and 13 only a few recesses 71 and bores 72 are shown. However, in practice they are arranged equidistantly along an entire semi-circle of the mounting plate 70.

The bushings 74 are mounted in the recesses 71 of the mounting plate 70 by inserting ends of the bushings 74 in the recesses. The bushings 74 are provided with central bores having inner threads 75. The bushings 74 may thus be retained in the recesses by inserting stay bolts 78 from the second side of the mounting plate 70 and through the bores 72 of the mounting plate 70. The bushings will then extend from the first side 77 of the mounting plate and be oriented substantially normal to a plane of the mounting plate 70.

In practice, the root end insert may be prepared by first mounting a first bushing 74 on the mounting plat and then arranging a first insert 76 next to and abutting the first bushing. Afterwards a second bushing 74 is arranged next to the first insert 76 and a second insert 76 next to the second bushing 74. This procedure is then continued until bushings 74 and inserts 76 are arranged along the entire semi-circle on the mounting plate, e.g. by arranging bushings 74 and inserts 76 from left to right as illustrated in FIG. 12. The inserts 76 need not be arranged in recesses on the first side 77 of the mounting plate, but may be retained between the bushings 74 due to the butterfly shape of the inserts 76.

The mounting plate 70 is provided with a number of protrusions 73, such as pins or rods, which extend from the side of the mounting plate 70. These protrusions 73 may used as connecting parts for providing a mating connection to corresponding parts on a frame of a lowering mechanism for arranging the root end insert on the surface 22 of the mould 20.

Figure 14:
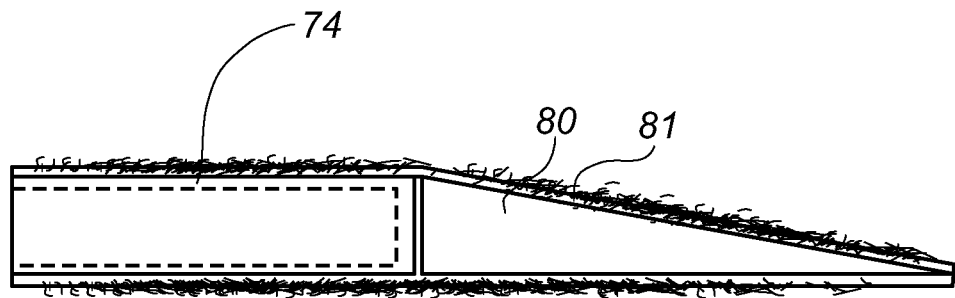
FIG. 14 shows a profile view of a bushing and wedge of the root end insert.

As shown in FIG. 14, wedges 80 are arranged in longitudinal extension of the bushings 74. The wedges may for instance be made of foamed polymer or balsawood, whereas the bushings are made of for instance cast iron or stainless steel. The wedges 80 are arranged so that the thick part of the wedge 80 is arranged proximal to the bushing 74, and the thin, tapered part is arranged proximal to the bushing. This ensures that the fastening member has a gradual transition to the surrounding fibre layers of the final blade shell part, thereby ensuring that the blade root does not have a steep or discontinuous stiffness transition A fibre layer 81 may be wrapped around a bushing 74 and a wedge 80. Advantageously, the fibre layer is relatively thin band that is wrapped in a helix shape around the two parts. Thereby, the fibre layer 81, bushing 74 and wedge can be mounted together on the mounting plate 70. The fibre layer 81 may advantageously comprise non-woven fibres or randomly oriented fibres, such as for instance glass wool. This facilitates a relative strong bonding in the polymer matrix after the later infusion and curing of the polymer.

The inserts 76 preferably also has a profile that corresponds to the profile of bushings 74 and the wedges 80. In other words, the inserts 76 preferably comprises a tapering part or wedge part at a proximal end thereof. The tapering part is advantageously integrally formed with the insert 76. The inserts 76 may advantageously be made of a fibre-reinforced composite structure, e.g. a fibre pultrusion comprising pultruded glass fibres or carbon fibres.

Figure 15:
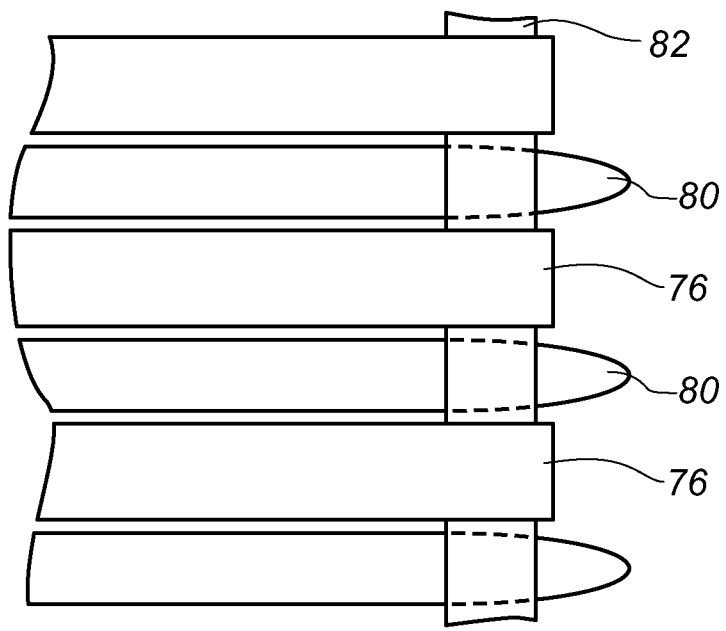
FIG. 15 shows a top view of wedges and inserts of the root end insert.

As shown in FIG. 15 the tapering part or wedge part of the inserts 76 may be aligned with the wedges 81 arranged in longitudinal extension of the bushings 74. This may be carried out by weaving a fibre band under the tapering part of the inserts and over the wedges 81 of the fastening members or vice versa.

Figure 16:
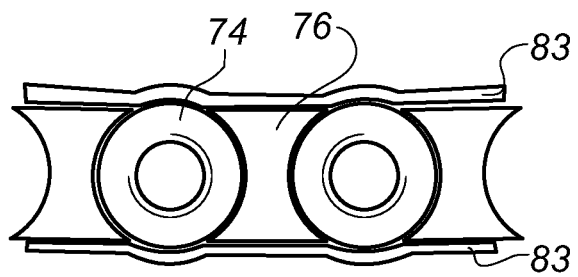
FIG. 16 shows a cross-section of the root end insert.

Afterwards, an additional fibre layer 83 may be tightly wrapped and draped around the bushings 74, wedges 80 and inserts 76 such that the root end insert has a cross-section as shown in FIG. 16. The additional fibre layer 83 may for instance be a triaxial fibre layer comprising reinforcement fibres oriented −45 degrees, 0 degrees and 45 degrees compared to the longitudinal direction of the blade shell and mould. This provides strength in both the longitudinal direction and the transverse direction of the blade shell and increases the pull-out strength of the bushings 74. Additionally, fibre bands (not shown) may be wrapped around the additional fibre layers 83 near the tapering parts of the wedges 81 and inserts 76 so as to ensure a smooth transition to the surrounding fibre layers in the layup.

Figure 18:
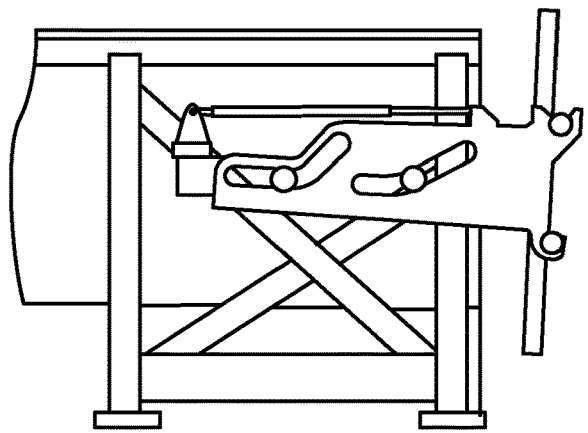
Figure 19:
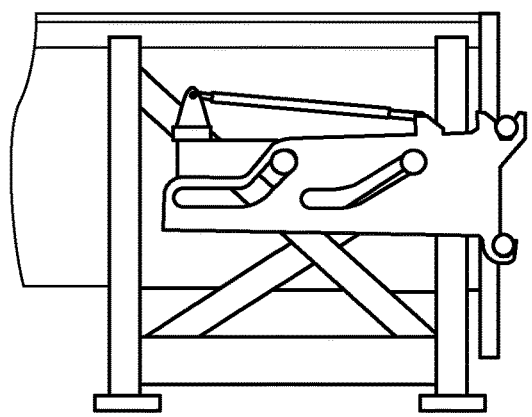

The root end insert has now been prepared and is ready to be arranged on top of the outer fibre layers 68. This may be carried out as shown in FIGS. 17-19 by arranging the mounting plate 70 with the mounted root end insert (not shown) on a lowering mechanism 85 that may lower and arrange the root end insert on the mould surface 22 of the mould 20.

The lowering mechanism 85 may advantageously be attached to sides of the mould 20. The lowering mechanism 85 comprises a frame 86, which is provided with carrying means in form of hooks 92 that may matingly engage the protrusions 73 of the mounting plate 70 such that the mounting plate is connected to or resting on the frame 86.

The frame 86 comprises a front guiding slot 89 and a rear guiding slot 90, which engage a front guiding roller 87 and a rear guiding roller 88, respectively. The lowering mechanism further comprises a driving means in form of a telescopic piston cylinder 91 that is connected between a stationary part of the lowering mechanism 85 and the frame 86. The telescopic piston cylinder 91 may advantageously be hingedly connected to the stationary part and the frame 86. The guiding slots 89, 90 are shaped so that the frame 86 and therefore also the mounting plate 70 with the root end insert are moved according to a desired motion.

Figure 17:
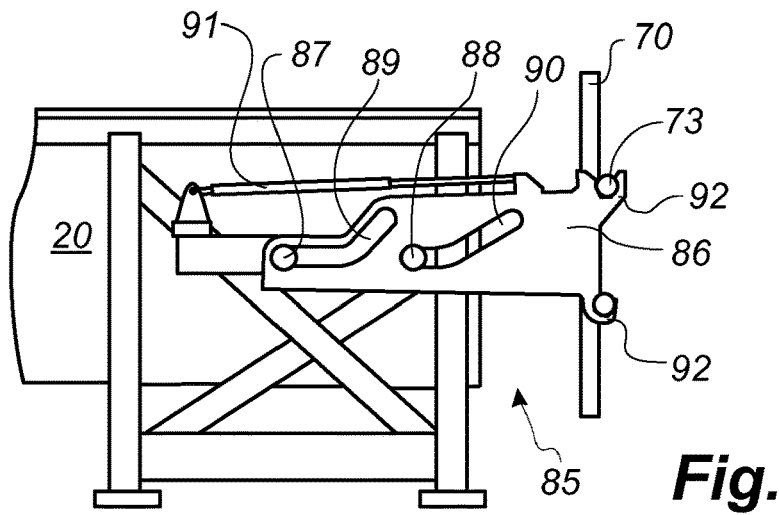
FIGS. 17-19 show schematic side views of the mould provided with a lowering mechanism according to the invention.

FIG. 17 shows the lowering mechanism 85 in the mounting position, where the mounting plate 70 together with the root end insert are arranged on the frame 86 of the lowering mechanism 85. The mounting plate 70 is mounted on the frame 86 in a substantially vertical orientation.

When the telescopic piston cylinder 91 begins to retract the piston, the frame 86 is moved on the guiding rollers 87, 88 via the guiding slots 89, 90. As seen, the guiding slots each comprise a horizontal slot part and an angled slot part. The horizontal slot part of the front guiding slot 89 is longer than the horizontal slot part of the rear guiding slot 90, and the angled part of the front guiding 89 slot is angled more compared to a horizontal plane than the angled part of the rear guiding slot 90. Thereby, the frame 86 will in a first motion (from FIG. 17 to FIG. 18) be lowered down towards the moulding surface 22 of the mould, while the frame 86 and mounting plate 70 are tilted so that the root end insert is angled upwards in the longitudinal direction of the mould.

The lowering a tilting motion continues until the root end insert substantially contacts the moulding surface 22 of mould 20, after which a second motion step (from FIG. 18 to FIG. 19) is carried out. In the second motion step, the frame 86 with mounting plate 70 and root end insert are pivoted until the mounting plate 86 is oriented arranged substantially vertically and the root end insert rests on the mould surface 22 of the mould 20. This motion ensures that the fibre material 68 that has already been arranged on the mould surface 22 is not distorted or otherwise wrinkled.

Figure 20:
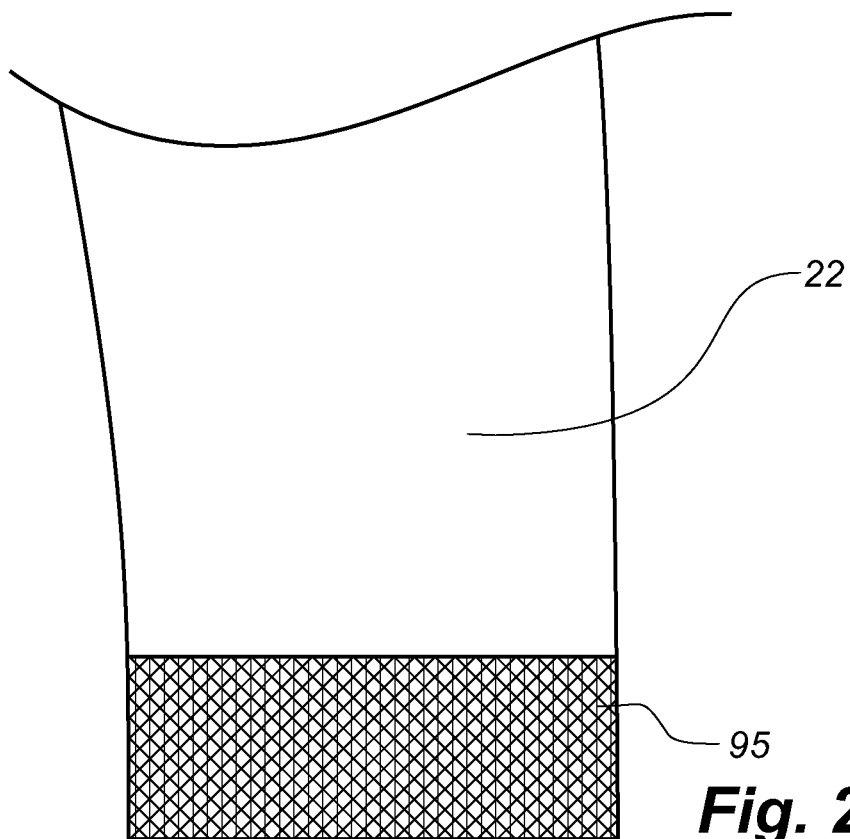
FIG. 20 shows a top view of a mould surface of the mould with inner fibre layers arranged on top of the root end insert.

Afterwards, a number of inner fibre layers 95 are as shown in FIG. 20 arranged on top of the root end insert. The inner fibre layers 95 may for instance be triaxial fibre layers comprising reinforcement fibres oriented −45 degrees, 0 degrees and 45 degrees compared to the longitudinal direction of the blade shell and mould. This provides strength in both the longitudinal direction and the transverse direction of the blade shell and increases the pull-out strength of the bushings 74.

Figure 21:
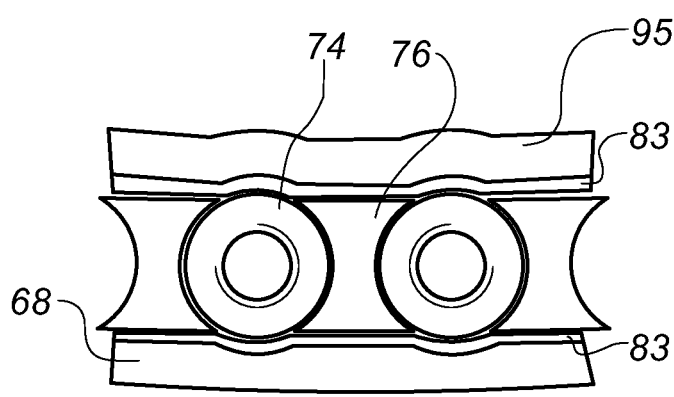
FIG. 21 shows a cross-section of the layup in a root section of the mould.

FIG. 21 shows a cross-section of the final layup at the root part of the mould. As seen, the layup comprises bushings 74 and inserts 76 wrapped in a fibre layer 83 and sandwiched between outer fibre layers 68 and inner fibre layers 95.

Finally, a vacuum bag is sealed against the mould 20, and the mould cavity formed between the vacuum bag and the mould 20 is evacuated, after which a liquid resin is drawn into the mould cavity and impregnates the fibre material. Finally, the resin is cured so as form the shell part. This shell part may then be adhered to another shell part, e.g. along leading and trailing edge thereof, so as to form the aerodynamic shell of the wind turbine blade. The mounting plates may be removed prior to this process. Alternatively, the mounting plates may be left on and first be removed prior to the wind turbine blade being mounted on a wind turbine hub.

LIST OF REFERENCE NUMERALS 2 wind turbine
4 tower
6 nacelle
8 hub
10 blade
11 blade shell
14 blade tip
16 blade root
20 mould
22 mould surface
23 blade shell
24 fibre mats
30 fibre mat layup system
32 first drive roller
34 cutting device
36 first clamping device
38 buffer roller
39 buffer length
40 second drive roller
42 tray
44 slots
46 storage position/retracted position
48 draping device
50 fibre mat roll
60 cart/portal
61 telescopic portion
62 telescopic portion
63 frame 64 pivot
65 wheel/track
66 floor
68 outer fibre layer(s)
70 mounting plate
71 recess
72 bore/hole
73 protrusions/pins/rods
74 bushings/fastening means
75 central bore with inner thread
76 insert/butterfly wedge
77 first side of mounting plate
78 stay bolt
79 second side of mounting plate
80 wedge
81 fibre layer with non-woven fibres or randomly oriented fibres
82 fibre band
83 fibre layer wrapped around bushings and inserts
85 lowering mechanism/lowering device
86 frame
87 front guiding roller
88 rear guiding roller
89 front guiding slot
90 rear guiding slot
91 driving means/telescopic piston cylinder
95 inner fibre layer(s)

The invention claimed is:

1. A method of manufacturing a wind turbine blade shell part, wherein the wind turbine blade shell part is manufactured as a composite structure comprising a fibre-reinforcement material embedded in a polymer matrix, and wherein the wind turbine blade shell part is provided with a root end insert that, when manufactured, is accessible from a root end of the wind turbine shell part, and wherein the wind turbine blade shell part is manufactured in a mould provided with a moulding surface that defines an outer shape of the wind turbine blade shell part, the moulding surface extending along a longitudinal direction, wherein the method comprises the steps of:
 a) arranging one or more outer fibre layers of the fibre-reinforcement material on the moulding surface, the one or more outer fibre layers defining an outer surface of the wind turbine blade shell part;
 b) arranging the root end insert on a lowering device of the mould;
 c) lowering the root end insert to the moulding surface of the mould via the lowering device, wherein the lowering of the root end insert to the moulding surface of the mould comprises:
  c1) lowering the root end insert to the moulding surface while the root end insert is angled upwards in the longitudinal direction until a first end of the root end insert contacts a part of the moulding surface at the root end; and
  c2) following step c1), tilting the root end insert until the root end insert rests on the moulding surface;
 supplying a polymer to the one or more outer fibre layers; and
 allowing the polymer to cure to form the composite structure of the wind turbine blade shell part.

2. The method according to claim 1, wherein the root end insert prior to step b) is arranged on a mounting plate, and wherein the root end insert is arranged on the lowering device via the mounting plate.

3. The method according to claim 1, wherein the root end insert comprises a plurality of fastening members.

4. The method according to claim 3, wherein the plurality of fastening members comprise a plurality of bushings.

5. The method according to claim 3, wherein the root end insert further comprises a plurality of inserts respectively arranged between the plurality of fastening members.

6. The method according to claim 1, further comprising arranging one or more inner fibre layers of the fibre-reinforcement material on top of the root end insert.

7. The method according to claim 6, further comprising supplying the polymer to the one or more inner fibre layers.

8. The method according to claim 1, wherein the lowering device comprises a frame for carrying the root end insert and a driving means for lowering the frame together with root end insert.

9. The method according to claim 1, wherein a frame and the root end insert are lowered onto the moulding surface of the mould via guiding slots and guiding pins or rollers.

* * * * *